US010440123B2

(12) United States Patent
Thazhathethil

(10) Patent No.: US 10,440,123 B2
(45) Date of Patent: Oct. 8, 2019

(54) METHOD AND SYSTEM FOR SECURE BIDIRECTION COMMUNICATION FOR INDUSTRIAL DEVICES

(71) Applicant: ABB Schweiz AG, Baden (CH)

(72) Inventor: Shabeer Thazhathethil, Palakkad (IN)

(73) Assignee: ABB Schweiz AG, Baden (CH)

( * ) Notice: Subject to any disclaimer, the term of this patent is extended or adjusted under 35 U.S.C. 154(b) by 178 days.

(21) Appl. No.: 15/317,115

(22) PCT Filed: Jun. 11, 2015

(86) PCT No.: PCT/IB2015/054415
§ 371 (c)(1),
(2) Date: Dec. 7, 2016

(87) PCT Pub. No.: WO2015/189795
PCT Pub. Date: Dec. 17, 2015

(65) Prior Publication Data
US 2017/0111452 A1    Apr. 20, 2017

(30) Foreign Application Priority Data
Jun. 13, 2014  (IN) ............................ 2899/CHE/2014

(51) Int. Cl.
G06F 15/16       (2006.01)
H04L 29/08       (2006.01)
(Continued)

(52) U.S. Cl.
CPC ........ H04L 67/125 (2013.01); H04L 12/4633 (2013.01); H04L 41/0803 (2013.01); H04L 67/141 (2013.01); H04L 67/42 (2013.01)

(58) Field of Classification Search
CPC ... H04L 67/141; H04L 67/42; H04L 12/4633; H04L 41/0803; H04L 67/10; H04L 67/125
See application file for complete search history.

(56) References Cited

U.S. PATENT DOCUMENTS

2007/0043457 A1* 2/2007 Davis .............................. 700/90
2010/0302940 A1* 12/2010 Patel ....................... H04L 12/56
                                                       370/230
(Continued)

FOREIGN PATENT DOCUMENTS

WO    2012070044 A1    5/2012

OTHER PUBLICATIONS

European Patent Office, International Search Report for PCT/IB2015/054415, dated Aug. 20, 2015, 4 pages.
(Continued)

Primary Examiner — Liang Che A Wang
Assistant Examiner — Ayele F Woldemariam
(74) Attorney, Agent, or Firm — Barnes & Thornburg LLP

(57) ABSTRACT

A method and system for establishing bidirectional remote communication between a Remote Service Portal and a plurality of drives is described. The method and system use a bidirectional remote communication interface for bidirectional remote communication that comprises a network adaptor for installing a client server connected to the drives and configured for bi-directional secure data exchange and handling the drive related action and data for each drive, a CommGrid server configured as a communication server configured to communicate with the client server and the RSP, and a web socket based communication protocol for the bidirectional remote communication between the RSP, the client server and the CommGrid server that uses request and response packets for handling request actions and response actions respectively, comprising a plurality of blocks, and wherein the plurality of blocks comprise Data block, Digital Signature block, Device Key block and Action specification block.

7 Claims, 4 Drawing Sheets

Figure 1:
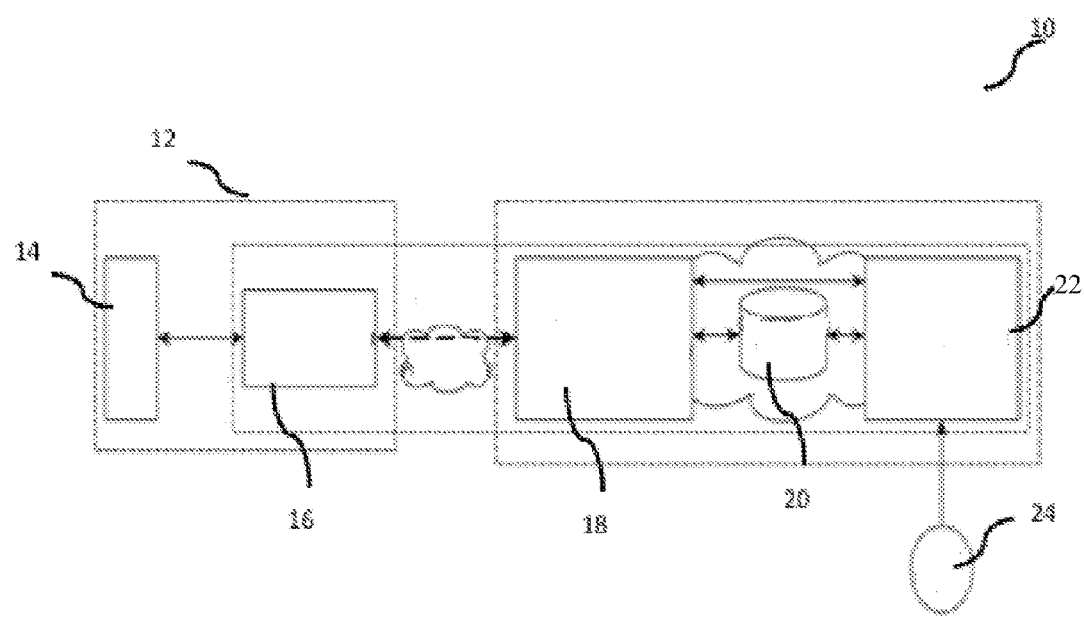

(51) Int. Cl.
*H04L 12/46* (2006.01)
*H04L 12/24* (2006.01)
*H04L 29/06* (2006.01)

(56) References Cited

U.S. PATENT DOCUMENTS

| | | | |
|---|---|---|---|
| 2011/0029682 A1* | 2/2011 | Waters | 709/230 |
| 2012/0130400 A1* | 5/2012 | Brock | 606/130 |
| 2013/0318345 A1* | 11/2013 | Hengeveld | H04L 9/28 726/1 |
| 2014/0330977 A1* | 11/2014 | van Bemmel | H04L 69/16 709/226 |

OTHER PUBLICATIONS

European Patent Office, Written Opinion of the International Searching Authority for PCT/IB2015/054415, dated Aug. 20, 2015, 8 pages.

European Patent Office, International Preliminary Report on Patentability for PCT/IB2015/054415, dated Dec. 15, 2016, 9 pages.

\* cited by examiner

METHOD AND SYSTEM FOR SECURE BIDIRECTION COMMUNICATION FOR INDUSTRIAL DEVICES

CROSS-REFERENCE TO RELATED APPLICATIONS

This application is a U.S. national stage of International Application Serial No. PCT/IB2015/054415, filed Jun. 11, 2015, which claims priority to Indian Patent Application No. 2899/CHE/2014, filed Jun. 13, 2014. The entire disclosures of both of the foregoing applications are hereby incorporated by reference.

FIELD OF THE INVENTION AND USE OF INVENTION

The invention generally relates to the field of drive systems for industrial devices and more specifically to a method and system for secure bidirectional communication between the drive remotely.

PRIOR ART AND PROBLEM TO BE SOLVED

An AC drive is a device that is used to control the speed of an electrical motor, either an induction motor or a synchronous motor. AC drives are also known by various other names such as adjustable speed drives (ASD) or adjustable frequency drives (AFD) or variable frequency drives (VFD) or variable speed drives (VSD) or frequency converters (FC). These drives are used in industry applications and need to be monitored and fine-tuned often for a consistent performance and hazard free running.

Currently, if drives (in customer-premises) require a maintenance or troubleshooting action, the Site Engineer or Service Engineer normally goes to the site and manually does the servicing by using drive panels (a handheld drive control device attached to the drive) or PC tools. Basic troubleshooting steps are fault checking, parameter settings, download data loggers, parameters, software/firmware update, download APBU loggers and fault reset.

The current technologies and techniques have limitations of manual maintenance that have to be necessarily done by physically being present onsite and hence delay and lag in the maintenance or trouble shooting action, as well as reliance on expert manpower to handle these tasks, which additionally requires to be done in secure environments to protect larger infrastructure that is connected through these drives. Some recent developments to address these issues have started, but there continues to be a need to find novel techniques that address the issues of physical presence of expert manpower at the site of malfunction of the AC drives and security concerns for critical infrastructures like power, water and the like that extensively use AC drives in their operations.

OBJECTS OF THE INVENTION

The invention described herein aims to provide a method and system for secure way of handling the remote communication to an AC drive for secure task execution in the AC drive through a bidirectional channel that provides a bidirectional communication interface for communicating between a remote service portal and the drives using a client server installed at the drive end a remote communication server and that uses a WebSocket Messages Oriented Application Protocol (WSMOAP) for bidirectional remote communication between the RSP, the client server and the communication server.

SUMMARY OF THE INVENTION

In one aspect, a drive system for bidirectional remote communication is provided that includes multiple drives connected to respective motors; a remote service portal (RSP) accessible to a user; and a bidirectional remote communication interface for bidirectional remote communication between the plurality of drives and the RSP. The bidirectional remote communication interface includes a network adaptor (NETA) for installing a client server connected to the plurality of drives, wherein the client server is configured as a secure bidirectional connection tunnel for data exchange and handling drive related action and data for each drive, a CommGrid server configured as a communication server configured to communicate with the client server and the RSP, and a WebSocket Messages Oriented Application Protocol (WSMOAP) as a communication protocol for the bidirectional remote communication between the RSP, the client server and the CommGrid server. The communication protocol comprises request and response packets for handling request actions and response actions respectively. The request and response packets comprise a plurality of blocks, and these blocks comprise Data block, Digital Signature block, Device Key block and Action specification block.

In another aspect, a method for establishing bidirectional remote communication between a Remote Service Portal (RSP) and drives in the drive system as mentioned above is described. The method includes initiating a connection request from the client server to the CommGrid server using a pre-configured token; verifying the pre-configured token by the CommGrid server using a communication database that stores a plurality of pre-configured tokens; accepting the connection request if the pre-configured finds a match in the plurality of the pre-defined tokens, else refusing the connection; sending a connection response with a response identifier to the client server if the connection requested is accepted; verifying the response identifier at the client server to establish a valid connection; opening a bi-directional communication channel between the RSP and the drive for remote servicing. The method also includes steps for exchanging request and response actions between the RSP and the client server for reporting drive status and for implementing drive actions at the drive.

DRAWINGS

Figure 2:
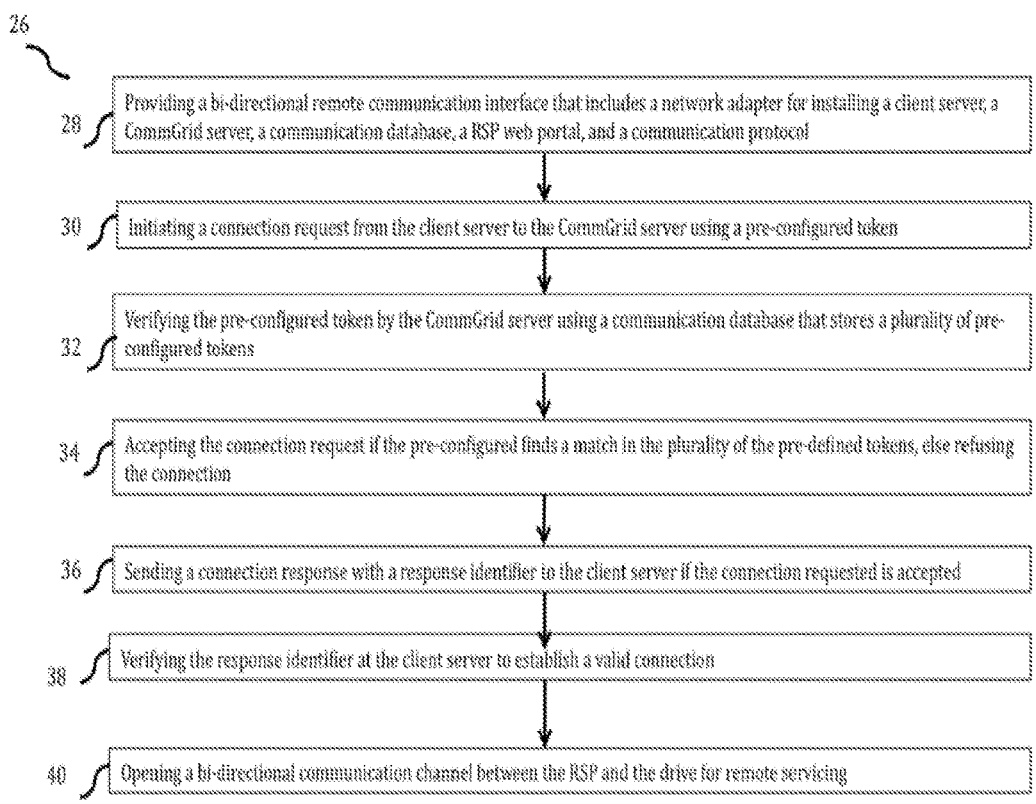
Figure 3:
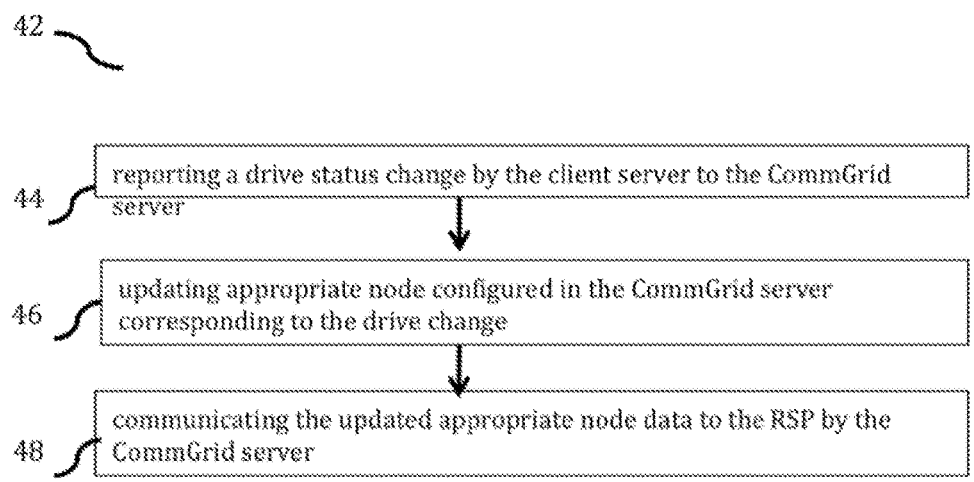
Figure 4:
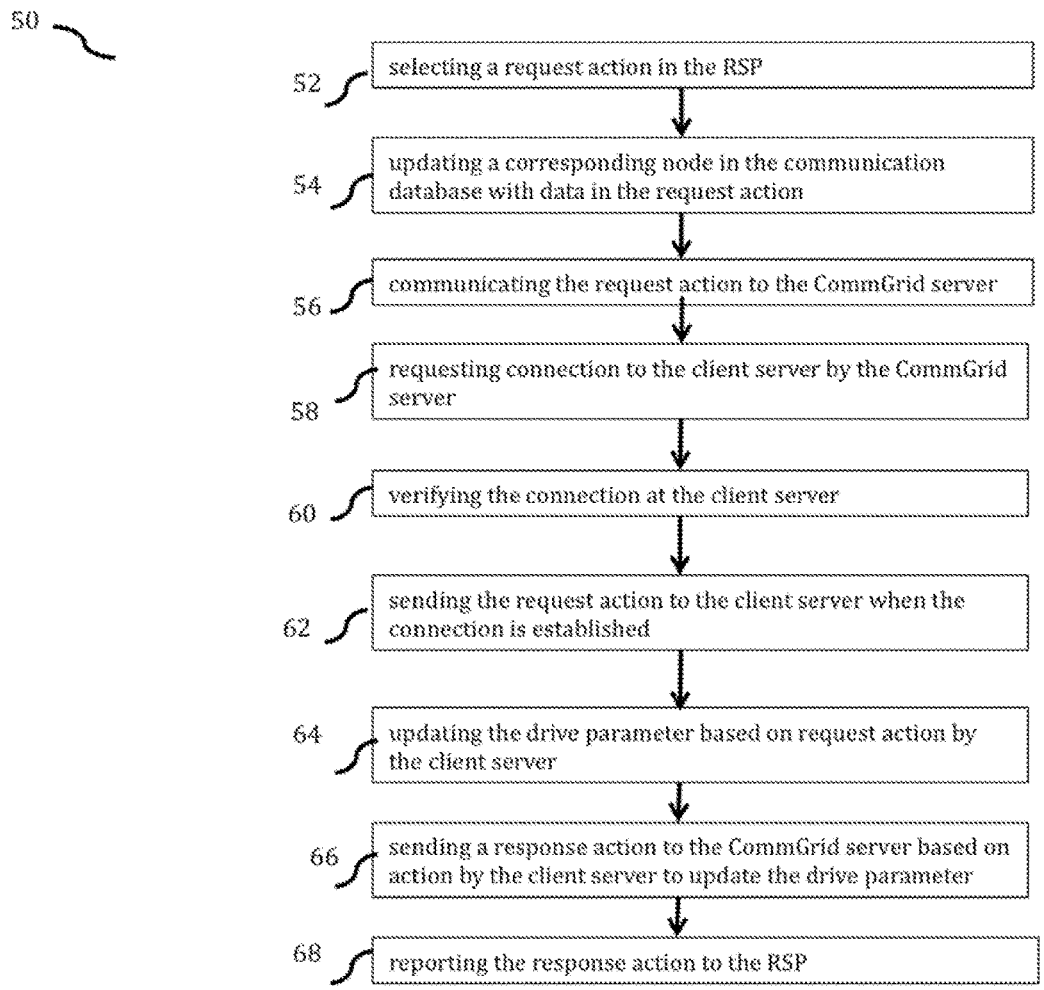

These and other features, aspects, and advantages of the present invention will become better understood when the following detailed description is read with reference to the accompanying drawings in which like reference numerals represent corresponding parts throughout the drawings, wherein:

FIG. 1 is a diagrammatic representation of a drive system for bidirectional remote communication that includes multiple drives; a remote service portal (RSP) accessible to a user; and a bidirectional remote communication interface according to one aspect of the invention; and FIG. 2-4 are flowchart representation of an exemplary method for establishing bidirectional remote communication between a Remote Service Portal (RSP) and drives in the drive system of FIG. 1, and method steps showing how the flow of data is structured in the bidirectional communication channel.

DETAILED DESCRIPTION OF THE INVENTION

As used herein and in the claims, the singular forms "a," "an," and "the" include the plural reference unless the context clearly indicates otherwise.

The drive system of the invention described herein includes several components that are defined briefly herein. A drive is a device that is used to control the speed of an electrical motor includes an AC drive. A network Adapter (NETA) is a network device for drives' network communication (Intranet and Internet).

FIG. 1 is a diagrammatic representation of the drive system 10 for bidirectional remote communication between the drives 14 at a customer site 12. The NETA has a CommGrid client (referred as client server) installed at the client site and shown as block 16, to make a secure bidirectional persistent connection as a tunnel to a communication server 18 (referred also as CommGrid server) for data exchange and handles the drive related actions and data. The client server can also perform set of drive related actions, referred as "drive actions" listed below:

Drive Status reporting
Parameter Settings
Data logger download
APBU download
Firmware update.
Software Update.
Signal data pooling.
Event reporting (alarms and faults)

The CommGrid server 18 is a communication server which accepts and manages connections from NETA, authentication for the connection, and data exchange between users via RSP— Remote Service Portal 22 to drives 14. It accepts action requests from portal and forwards it to the right NETA and to the right drive. All the responses from NETA are deserialized and transferred to the portal view at RSP. The remote CommGrid server is hosted in cloud or any hosting environment. The communication layer of CommGrid server is powered by RFC6455 web socket server in an exemplary embodiment.

The Remote Service portal (RSP) 22 is a web portal user interface (UI) through which the user can remotely access the drive through CommGrid server 18. A web based protocol used for communication in this drive system is (WebSocket Messages Oriented Application Protocol (WSMOAP). This is a customized protocol for bidirectional communication developed top of rfc6455 web socket protocol.

A communication database 20, also referred as a Remote Service portal (RSP) database is a database which keeps data about the drive information, node details, and action requests from RSP and response results from drive/NETA. When a user gives an action request to the drive, this database keeps that information with an identifier. When the client server processes the request for the drive and sends a response to the drive, the CommGrid server stores this event in this database against the request identifier.

One skilled in the art would understand that basically, when any device needs to connect to internet either it needs its own capability to communicate to internet via Ethernet ports or USB internet cards; or it needs to be adding a network adapter specifically for that device. Here in the exemplary embodiment of the drive system, a network adapter NETA can communicate to the drives using different protocols mainly OPC, and opens communication to the internet.

The flow-chart 26 of FIG. 2 show exemplary method steps for establishing a secure bidirectional communication channel using the drive system of FIG. 1 (step 28). Under operation, when NETA starts up, client (referred herein as 'client server') initiates a connection request to the CommGrid server with a pre-configured token (generated with a client signature and a NETA serial no) as shown at step 30. While negotiating the connection from the client, CommGrid server checks the communication database if the pre-configured token received is from a valid client at step 32. If it is not, CommGrid server will reject the connection, else it will accept the connection from the client as shown at step 34 and build a protocol response with a connection ID (this ID includes server signature to ensure connecting to the valid server) as shown at step 36. This connection ID gets validated in client server as shown at step 38, and then only a persistent connection is established. This ensures a secure bi-directional connection that has been verified at client end and at server end. Standard SSLV3 client/server certificate can be used for communication tunnel security for CommGrid server and client.

When a connection is made between the client-server, remote service communication channel is ready for drive remote service as shown at step 40.

FIG. 3 is a flowchart 42 of exemplary steps for communication protocol under operation. If during the connectivity period a drive status changes (assume 'normal running' to 'fault condition'), the client server reports to the CommGrid server as shown at step 44. Server updates the appropriate node configured in the communication server for that client at step 46. Communication database already has the information about nodes attached to that client. This node change is read by Remote Service Portal (RSP) and is updated in RSP at step 48.

Request and Response to the drive via CommGrid Server-Client is based on WSMOAP as mentioned earlier. The request/response packets contain the different blocks, exemplary blocks being, Data block, Digital Signature block, Device Key block and Action specification block, and these blocks are explained below.

Data in request packet is the data to be used while performing the action in drive by client and data in response packet is the response data or result after the action from the client to the server. Digital signature is used for data integrity (to ensure data is not modified by third party vulnerabilities). Device Key is the node identifier for the client while exchanging data in and out. 'Action specification' mainly contains the information about what action to be performed in request packet and about what action has been done in response packets.

The drive system also allows for user intervention, and the FIG. 4 shows a flowchart 50 with exemplary steps for communication protocol that is user initiated. When the user would like to remotely change a parameter for a drive, the user selects the drive and an action he/she needs in RSP as shown at step 52. This action will be then updated in the communication database at step 54 and notified in CommGrid server at step 56. When it is notified in the server, the CommGrid server connection to the drive is checked for availability as shown at step 58 and authentication for the same is done at step 60. CommGrid server reads the information from the communication database and creates the request pack (WSMOAP data unit) at step 62. The data block in the request pack contains the meta information about what parameter value has to be changed and the value. When client receives this packet, it identifies the action that needs to be performed in the drive and reads the data for parsing it to the input format at step 64. When the node parameter change is done (write action for the identified node parameter is a success), the client creates the response pack at step 66 that is sent back to the server with the request identifier to update the request's response in RSP at step 68.

Thus it would be appreciated by those skilled in the art that the communication can be initiated either at client end or user end.

A Datalogger provided herein is a log buffer for signals which are generated in drive itself. This datalogger downloads the request processed from RSP via CommGrid server to the client server. The request processing action in the client also writes a 'trigger' command to the node to trigger the datalogger. Then the datalogger receiver in the client shall be willed after few seconds. When the buffer is filled and notified, the client copies the data to a physical file and sends to the CommGrid server. CommGrid server updates the file or file content against the node in communication database. RSP shall be notified and updated, about the data received in the node.

It is also possible to connect multiple drives to a branching unit called APBU. APBU can generate logs for drive signals of the drives connected to it. In one example the generated logs are stored in a file, and has a very large file size. An engineer or service personnel may require these logs for drive analysis or further troubleshooting. These log files are downloaded from APBU upon request and sent to the server. The server keeps these files in storage (example: cloud blob storage). Two kind of download can be set to APBU downloader in client server: on-demand download or a Scheduled download. On demand download is basically a request from RSP via CommGrid server to client server in NETA and triggers a download request to the APBU Unit. For scheduled download the client server in NETA has a scheduler to download and push the APBU to the server. When APBU is received in the storage of the server, the file information is updated in the RSP for download of the APBU for user.

As APBU is a large file, two types of file transport channels are used for file upload to the storage. Firstly, the CommGrid secure tunnel is used for fie transfer and secondly file upload is done via 'fileupload webservice' to storage.

It is also possible to send updates of software and firmware via CommGrid client-server.

In a specific implementation a datahub is attached to client server in NETA to collect signal data and detect parameter changes in drive. Whenever the datahub detects a change or a fault or a threshold alarm, it notifies to the client, the client server generates the data report in a format and sends to the CommGrid server for necessary action for the node as per the node information in the communication database.

Some of the notable features in the drive system described herein are that inbound connection to the drive or NETA are not allowed. Only outbound communication is allowed. The client only communicates to the CommGrid Server via port 443 (443-SSL Enabled secure, proxy friendly port). This allows for secure device detection or device discovery. Use of WSMOAP Protocol is advantageous as it creates less traffic over communication network.

In an exemplary embodiment, NETA is an embedded program and the client server hosted is a Windows/Linux server which has access to internet. This drive system in an exemplary implementation is designed using a standard N tiered architecture, with a Communication Tier, Application Tier and Data Access tier. The communication tier includes the WSMOP, WebSocket based protocol for handling all request/response packets as explained herein above. The Application Tier handles all of the business logic and the Data Access Layer (DAL) provides an abstraction to the database and stores procedures.

The described embodiments may be implemented as a system, method, apparatus or article of manufacture using standard programming and engineering techniques related to software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g. an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fibre, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

A computer program code for carrying out operations or functions or logic or algorithms for aspects of the present invention may be written in any combination of one or more programming languages which are either already in use or may be developed in future, such as but not limited to Java, Smalltalk, C++, C, Foxpro, Basic, HTML, PHP, SQL, Javascript, COBOL, Extensible Markup Language (XML), Pascal, Python, Ruby, Visual Basic .NET, Visual C++, Visual C#.Net, Python: Delphi, VBA, Visual C++ .Net, Visual FoxPro, YAFL, XOTcl, XML, Wirth, Water, Visual DialogScript, VHDL, Verilog, UML, Turing, TRAC, TOM, Tempo, Tcl-Tk, T3X, Squeak, Specification, Snobol, Smalltalk, S-Lang, Sisal, Simula, SGML, SETL, Self, Scripting, Scheme, Sather, SAS, Ruby, RPG, Rigal, Rexx, Regular Expressions, Reflective, REBOL, Prototype-based, Proteus, Prolog, Prograph, Procedural, PowerBuilder, Postscript, POP-11, PL-SQL, Pliant, PL, Pike, Perl, Parallel, Oz, Open Source, Occam, Obliq, Object-Oriented, Objective-C, Objective Caml, Obfuscated, Oberon, Mumps, Multiparadigm, Modula-3, Modula-2, ML, Miva, Miranda, Mercury, MATLAB, Markup, m4, Lua, Logo, Logic-based, Lisp (351), Limbo, Leda, Language-OS Hybrids, Lagoona, LabVIEW, Interpreted, Interface, Intercal, Imperative, IDL, Id, ICI, HyperCard, HTMLScript, Haskell, Hardware Description, Goedel, Garbage Collected, Functional, Frontier, Fortran, Forth, Euphoria, Erlang, ElastiC, Eiffel, E, Dylan, DOS Batch, Directories, Declarative, Dataflow, Database, D, Curl, C-Sharp, Constraint, Concurrent, Component Pascal, Compiled, Comparison and Review, Cocoa, CobolScript, CLU, Clipper, Clean, Clarion, CHILL, Cecil, Caml, Blue, Bistro, Bigwig, BETA, Befunge, BASIC, Awk, Assembly, ASP, AppleScript, APL, Algol 88, Algol 60, Aleph, ADL, ABEL, ABC, or similar programming languages or any combination thereof.

The different modules referred herein may use a data storage unit or data storage device that is selected from a set of but not limited to USB flash drive (pen drive), memory card, optical data storage discs, hard disk drive, magnetic disk, magnetic tape data storage device, data server and molecular memory.

A computer network may be used for allowing interaction between two or more electronic devices or modules, and includes any form of inter/intra enterprise environment such as the world wide web, Local Area Network (LAN), Wide Area Network (WAN), Storage Area Network (SAN) or any form of Intranet.

While only certain features of the invention have been illustrated and described herein, many modifications and changes will occur to those skilled in the art. It is, therefore, to be understood that the appended claims are intended to cover all such modifications and changes as fall within the true spirit of the invention.

I claim:

1. A drive system for bidirectional remote communication, the drive system comprising:
   a plurality of drives connected with a plurality of motors for controlling speeds of the plurality of the motors;
   a remote service portal (RSP) accessible to a user; and
   a bidirectional remote communication interface for bidirectional remote communication between the plurality of drives and the RSP, wherein the bidirectional remote communication interface comprises:
      a network adaptor (NETA) for installing a client server connected to the plurality of drives, wherein the client server is configured as a secure bidirectional connection tunnel for data exchange and handling drive related action and data for each drive, and
      a CommGrid server configured as a communication server configured to communicate with the client server and the RSP, to accept and manage connections originating from the NETA, to provide authentication for the connections, to accept request actions from the RSP and the client server, and to communicate the request actions and response actions between the client server and the RSP;
   wherein the NETA is configured to generate a response action after receiving a communication from the CommGrid server or after sending a request action to the CommGrid server;
   wherein the bidirectional remote communication between the RSP, the client server, and the CommGrid server applies a WebSocket Messages Oriented Application Protocol (WSMOAP), wherein the WSMOAP comprises request and response packets for handling the request actions and the response actions respectively, wherein the request and response packets each comprise a plurality of blocks, and wherein the plurality of blocks comprise a Data block, a Digital Signature block, a Device Key block, and an Action specification block; and
   wherein the RSP is operable by the user to remotely update a drive parameter of one of the plurality of drives by selecting a request action in the RSP, updating a corresponding node in a communication database with data in the request action, communicating the request action to the CommGrid server, requesting connection to the client server by the CommGrid server, verifying the connection at the client server, sending the request action to the client server when the connection is established, updating the drive parameter based on the request action by the client server, sending a response action to the CommGrid server based on action by the client server to update the drive parameter, and reporting the response action to the RSP.

2. The drive system of claim 1, comprising a plurality of network adaptors for installing a respective client server for each of the plurality of drives, wherein the CommGrid server is configured to accept request actions from the RSP for a specific drive and forward it to the corresponding network adaptor for action on the specific drive.

3. The drive system of claim 1, wherein the response action is deserialized and transferred to the RSP through the CommGrid server.

4. The drive system of claim 1, wherein the RSP user access is through a web portal user interface (UI) through which the user can remotely access the plurality of drives through the CommGrid server.

5. The drive system of claim 1, further comprising a communication database for storing drive data using a plurality of identifiers to identify pre-configured tokens, device information, node details, and request actions from the RSP and response results from NETA, wherein the communication database is accessible by the CommGrid server and the RSP.

6. A method for establishing bidirectional remote communication between a Remote Service Portal (RSP) and a plurality of drives, the method comprising:
   providing a bidirectional remote communication interface for bidirectional remote communication between the plurality of drives and the RSP, wherein the bidirectional remote communication interface comprises:
      a network adaptor (NETA) for installing a client server connected to the plurality of drives, wherein the client server is configured as a secure bidirectional connection tunnel for data exchange and handling of drive related action and data for each drive,
      a CommGrid server configured as a communication server configured to communicate with the client server and the RSP, and
      a web socket based communication protocol for the bidirectional remote communication between the RSP, the client server, and the CommGrid server that uses request and response packets for handling request actions and response actions respectively, wherein the request and response packets each comprise a plurality of blocks, and wherein the plurality of blocks comprise a Data block, a Digital Signature block, a Device Key block, and an Action specification block;
   initiating a connection request from the client server to the CommGrid server using a pre-configured token;

verifying the pre-configured token by the CommGrid server using a communication database that stores a plurality of pre-configured tokens;

accepting the connection request, by the CommGrid server, if the pre-configured token finds a match in the plurality of the pre-defined tokens, else refusing the connection;

sending, by the NETA, a connection response with a response identifier to the client server if the connection requested is accepted;

verifying the response identifier at the client server to establish a valid connection;

opening a bi-directional communication channel between the RSP and the drive for remote servicing; and remotely updating a drive parameter initiated by a user action through the RSP, the remotely updating comprising:

selecting a request action in the RSP;

updating a corresponding node in the communication database with data in the request action;

communicating the request action to the CommGrid server;

requesting connection to the client server by the CommGrid server;

verifying the connection at the client server;

sending the request action to the client server when the connection is established;

updating the drive parameter based on the request action by the client server;

sending a response action to the CommGrid server based on action by the client server to update the drive parameter; and reporting the response action to the RSP.

7. The method of claim 6, further comprising:

reporting a drive status change by the client server to the CommGrid server;

updating appropriate node data configured in the CommGrid server corresponding to the drive change; and communicating the updated appropriate node data to the RSP by the CommGrid server.

\* \* \* \* \*